June 26, 1962   J. W. FITZGERALD ETAL   3,040,562
METHOD FOR DETERMINING THE CONSTITUENTS
OF MILK AND MILK PRODUCTS
Filed Feb. 27, 1950   3 Sheets-Sheet 1
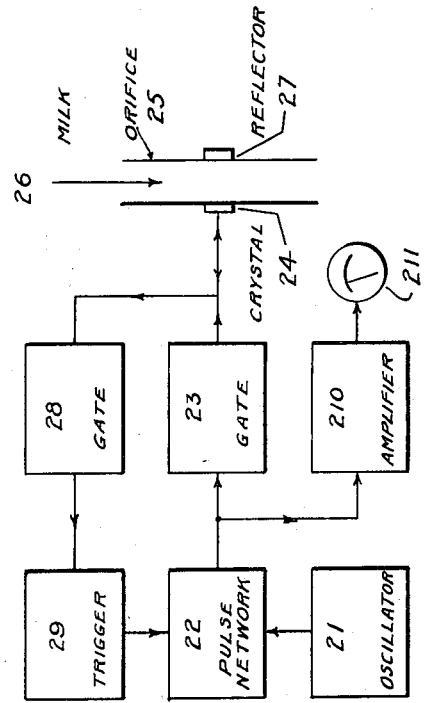
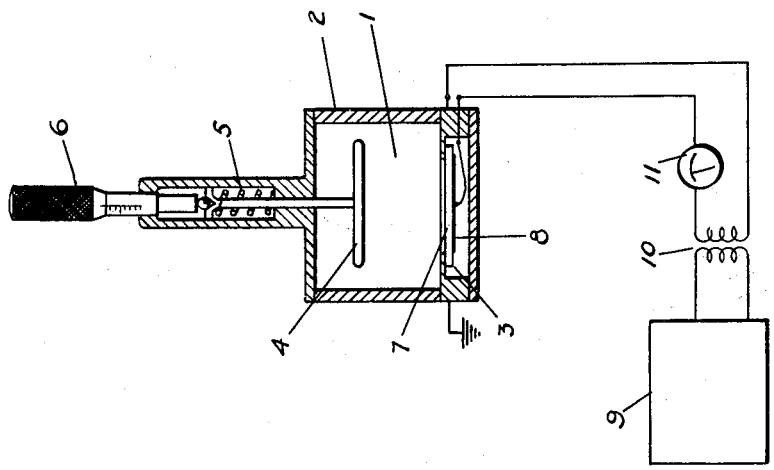
INVENTORS
James W. Fitzgerald
William C. Winder
G. Roy Ringo
BY Joseph G. Werner
ATTORNEY June 26, 1962  J. W. FITZGERALD ETAL  3,040,562
METHOD FOR DETERMINING THE CONSTITUENTS
OF MILK AND MILK PRODUCTS
Filed Feb. 27, 1950  3 Sheets-Sheet 2
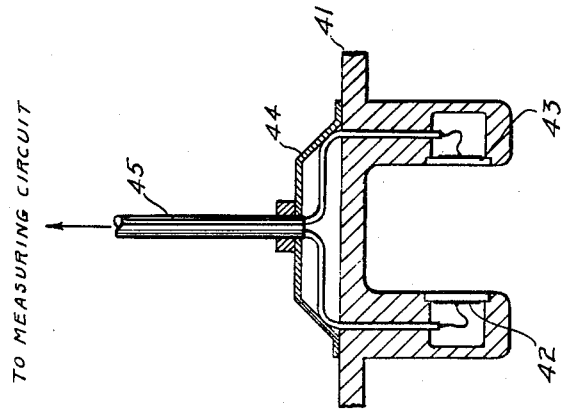
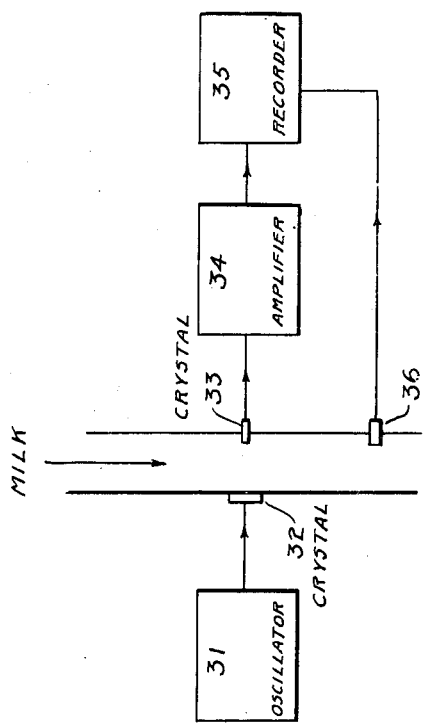
INVENTORS
James W. Fitzgerald
William C. Winder
G. Roy Ringo
BY Joseph G. Werner
ATTORNEY

SOUND VELOCITY VS. TEMPERATURE

United States Patent Office 3,040,562
Patented June 26, 1962

3,040,562
METHOD FOR DETERMINING THE CONSTITU-ENTS OF MILK AND MILK PRODUCTS
James W. Fitzgerald, Fish Creek, and William C. Winder, Madison, Wis., and George Roy Ringo, La Grange Park, Ill., assignors, by mesne assignments, to Chesapeake Instrument Corporation, Shadyside, Md., a corporation of Maryland
Filed Feb. 27, 1950, Ser. No. 146,514
8 Claims. (Cl. 73—53)

This invention relates to methods for determining the major constituents of milk and milk products, and for automatically controlling various operations in the processing of milk and milk products.

The major constituents of importance in milk systems are commonly classified as butter fat, solids-not-fat, and total solids. The butter fat and solids-not-fat, taken together, comprise the total solids. The remaining ingredient is water.

That the determination of the solid constituents of milk and milk products is of considerable importance in the dairy industry is evidenced by the fact that the amount of such constituents, particularly the butter fat, is the usual basis for determining their price, food value, and compliance with state and Federal laws and regulations. Moreover, the operator of any plant engaged in processing milk products must know the composition of such products for efficient operation.

The dairy industry has realized for a long time that a more equitable basis for pricing milk would consider not only the fat content but the solids-not-fat as well. Such payment has been hindered, heretofore, by lack of rapid test for solids-not-fat. Our invention now makes such a rapid test possible.

The most common method previously in use for the determination of butter fat content in milk is the Babcock test. A measured quantity of milk is treated with sulfuric acid and the released fat centrifuged into the calibrated neck of the test bottle. Other reagents have been similarly used for testing milk products, such as the Minnesota reagent. Such tests, however, are not amenable to instantaneous and continuous readings. Greater accuracy may be obtained by ether extraction methods, but with a sacrifice of time and simplicity. Total solids of milk and milk products may be determined by the use of gravimetric procedures, which are slow and difficult. Other techniques for obtaining the moisture content of milk products have been used; for example, the Karl Fischer Water Titration Method, the Toluol Distillation Method, conductivity and dialectric constant measurements. Such techniques, however, generally exclude milk or dairy products having a moisture content in excess of 20%. In most tests the specimens of milk and milk products tested are rendered inedible and otherwise useless. Under existing methods tests cannot generally be made of products held in sealed containers.

There is a great need in the dairy product industry for methods of automatically controlling various operations in processing milk and milk products, which, for the most part, has not been met.

It is an object of the present invention to provide an improved method for determining the major constituents of milk and milk products which will avoid the disadvantages attendant upon prior techniques by utilizing principles novel in the art. Specifically, the present invention will provide methods for determining the butter fat content, as well as solids-not-fat content, of milk and milk products, having a high degree of accuracy and which will give practically immediate results capable of direct and continuous reading.

It is a further object of the invention to provide improved methods for determining the major constituents of milk and milk products which may be used for continuous flow systems of milk and milk products in liquid, semiplastic, or plastic form, as well as for batch processes for milk and milk products.

A further object of the invention is to provide methods for determining the major constituents of milk and milk products which may be effected more efficiently, more rapidly, and more simply than heretofore possible.

Another object of the invention is to provide improved methods for determining the major constituents of milk and milk products which is nondestructive as to the quality and usefulness of the milk or milk products so tested.

An additional object of the invention is to provide improved methods for determining the major constituents of milk and milk products when such milk and milk products are held or wrapped in certain types of sealed containers.

A further important object of the invention is to provide improved methods for automatically controlling various operations in the processing of milk and milk products.

Other objects and advantages of the invention will be apparent from the following detailed description.

We have found that the propagation of elastic waves (also termed sound waves, mechanical vibrations, ultrasonic waves, etc.) through a milk system may be utilized as a part of a method for measuring the amounts of the constituents, that is, the butter fat and solids-not-fat. In particular, among the experimental relations we have discovered are: (1) the velocity of propagation of an elastic wave through milk systems increases as the amount of solids-not-fat increases, (2) the velocity increases, remains substantially constant, or decreases with an increase in butter fat content accordingly as the temperature of the milk system is, respectively, below in the neighborhood of, or above a certain "characteristic" temperature, and (3) the rate of change of velocity with temperature remains substantially constant with changes in the amount of solids-not-fat, but decreases with an increase in butter fat content.

We have further found that: (1) the attenuation of intensity of the elastic wave as it traverses the milk system increases with an increase in solids-not-fat, (2) the attenuation also increases with an increase of butter fat content, and (3) the magnitude of the attenuation is much more markedly affected by the butter fat content than by the solids-not-fat.

These and other acoustical characteristics of milk and milk products serve as a basis for our methods for determining the constituents of such milk systems.

The principles of operation of our invention are based on phenomena well known in the science of acoustics. Among these is the fact that the velocity of propagation of elastic waves in a mixture of two continuous media, or in a mixture of a continuous medium and dispersed particles of a second medium, depends on the relative concentrations of the constituents. Furthermore, it is known that dispersed particles in a continuous medium generally cause an increase in the attenuation over and above that of the continuous medium alone. The exact theory of these phenomena is complex and not yet complete in the science of acoustics and molecular physics, nor is it our purpose to present here in any detail the present status of the theory of propagation of elastic waves in such media. It is sufficient to state that we have discovered relations between the propagation constants of an elastic wave (that is, the velocity of propagation and the attenuation of intensity) in a milk system and the constituents of the system that can serve as a basis for determining the said constituents.

The unique physical properties of milk and milk products make possible the application of our acoustic methods for determining the proportions of the constituents. Milk is a heterogeneous system consisting of a fat phase dispersed in an aqueous phase. The aqueous phase is made up of solids in colloidal suspension (proteins) and solids in true solution (lactose, mineral salts). These solids, taken together, comprise the solids-not-fat group. This method is based on the fact that the major chemical constituents are substantially the same (though varying in concentration) and appear in essentially the same physical state.

A characteristic of milk important to some applications of our acoustic methods for testing is the fact that, though the total amount of ingredients comprising the solids-not-fat group varies, yet to a considerable extent, from the standpoint of acoustical properties, we have discovered that the change in relative proportions per se is not important. Consequently, the amount of solids-not-fat present in the milk system under test manifests itself in the velocity of propagation and attenuation of an elastic wave in the milk.

The fat phase is present in whole milk as an emulsion of butter fat globules in the aqueous phase. The fat globules are several thousand times larger than the colloidal particles of the aqueous phase. As a consequence of this size diff rence, as well as a difference in acoustic properties bet $\kappa$ en the fat globules and the solids-not-fat, whole milk acts like a composite acoustic medium of butterfat particles dispersed in a continuous medium of skimmed milk. Both the velocity of propagation (except at characteristic temperature) and the attenuation of an elastic wave in whole milk vary with the amount of fat present in the milk. Moreover, variations in butter fat content affect the attenuation more markedly than variations in the solids-not-fat, a fact important to some applications of our acoustic methods for testing milk systems.

Similarly, the composition of other milk products systems, for example, butter, whey, buttermilk, cream, evaporated milk, processed cheese, natural cheese, ice cream mix, and other dairy products, also provide the unique condition of fat phase-aqueous phase discontinuities, characteristic temperature, etc., as described above.

"Filled" milk and "filled" dairy products, i.e. milk products containing substituted vegetable fats or substituted vegetable proteins, also have similar physical properties that make such systems peculiarly suitable for use of our elastic wave methods to determine the fat content and the amount of solids-not-fat. However, filled milk systems can be expected to have characteristic temperatures different from natural milk systems, depending on the substituted constituent.

In order better to illustrate the manner of using the basic relationships between acoustic properties and constituents of milk systems, we shall list some procedures for obtaining the constituents by our acoustic methods.

(1) Solids-Not-Fat

The solids-not-fat can be determined through measurements of propagation velocity of an elastic wave in the milk system at the "characteristic" temperature. The characteristic temperature is a temperature at which the velocity in pure butter oil is equal to the velocity in water. As a consequence, variations in the butter fat content will not affect the velocity in the milk at this temperature. The significance of the characteristic temperature lies in the fact that at or near this temperature a velocity measurement is, by itself, sufficient for the determination of solids-not-fat. The characteristic temperature applies to any milk system containing fat and water, such as, whole milk, partially skimmed milks, coffee cream, whipping cream, buttermilk, evaporated and condensed milks, etc.

Even for temperatures not in the neighborhood of the characteristic temperature, the solids-not-fat can be determined through measurements of velocity, provided the butter fat content is known, is constant, or is negligible.

The solids-not-fat can also be determined through measurements of the attenuation of an elastic wave in the milk product, provided that the butter fat content is known, is constant, or is negligible.

(2) Butter Fat

The butter fat content can be determined through measurements of the propagation velocity of elastic waves in the milk system, provided that the solids-not-fat content is known, or is constant.

The butter fat can be determined through measurements of the rate of change of velocity with temperature. Due to the relative independence of this quantity from the solids-not-fat content, the latter need be neither known nor constant.

The butter fat can be, further determined by measurements of the attenuation of an elastic wave in the milk product. Because of the greater effect of butter fat on the attenuation, variations in the amount of solids-not-fat have little effect on this test.

The butter fat content can also be determined through scattering measurements. Part of the energy of the incident sound wave is scattered into directions other than the direction of propagation. The resulting loss of energy in the direction of propagation constitutes a portion of the attenuation. A scattering measurement, however, instead of measuring the decrease in intensity in the direction of propagation, determines an increase in intensity in some other direction. This scattered intensity is dependent on the volume concentration of the butter fat and, hence, can be used to measure the butter fat content.

(3) Total Solids

Total solids content of milk and milk products is most readily obtained by simple addition of previously determined butter fat and solids-not-fat. For example, using some of the above procedures, a single measurement of velocity and attenuation at the characteristic temperature of a given milk system would suffice to determine the butter fat, solids-not-fat, and the total solids of the system.

Other procedures and variations on our basic methods will be apparent to those skilled in the art.

There are several specific conditions for the test procedures that we have found useful. Most of them are not critical and can be varied to suit the particular system being studied. In the first place, as regards the intensity of the sound wave used in the test, it is important that the energy be low enough so as not to cause any appreciable thermal, physical, chemical, etc. effects such as are often found associated with high energy ultrasonic waves. We have found intensities of the order of 0.001 to 0.1 watt/sq. cm., more or less, to be satisfactory.

We have found that there is considerable latitude in the frequency at which suitable acoustic measurements of the constituents of milk systems can be made. Generally speaking, it is a matter of experimental convenience. The velocity is independent of frequency (except for a very small dispersion effect at very high ultrasonic frequencies) so that from the standpoint of its measurement almost any frequency is suitable. The attenuation, on the other hand increases as the frequency is increased. This means that for acoustic methods of determining milk product constituents that depend essentially on a measurement of attenuation, the most convenient frequency range will depend on the particular system being measured. For example, we have found that for low loss systems, such as skimmed milk and whole milk, the attenuation coefficient is readily measured in the frequency range of 10 to 100 megacycles, more or less. For high loss systems, such as processed cheese, frequencies as low as 500 kilocycles/second, more or less, can be used.

Except for methods depending on measurement at the characteristic temperature, the temperature at which our acoustic tests are made can also be suited to the particular system. For example, tests on milk, whey, buttermilk and cream would have a possible temperature range of 0° to 60° C., more or less. Evaporated and condensed milks may be tested within a range of 0° to 125° C., more or less. Processed and natural cheeses have a possible test range of 0° to 80° C., more or less.

Reasonable variations in pressure have little effect on our methods. However, gaseous discontinuities are generally to be avoided in these acoustic measurements.

In the accompanying drawings which are illustrative of the principles of the invention:

FIG. 1 is a view partly in section of one form of apparatus for practicing the novel methods of the present invention;

FIG. 2 is a diagrammatic view of another form;

FIG. 3 is a diagrammatic view of a further form;

FIG. 4 is a view partly in section of still another form embodying a transducer head suitable for use with either of the circuits shown in FIGS. 2 or 3.

Figure 5:
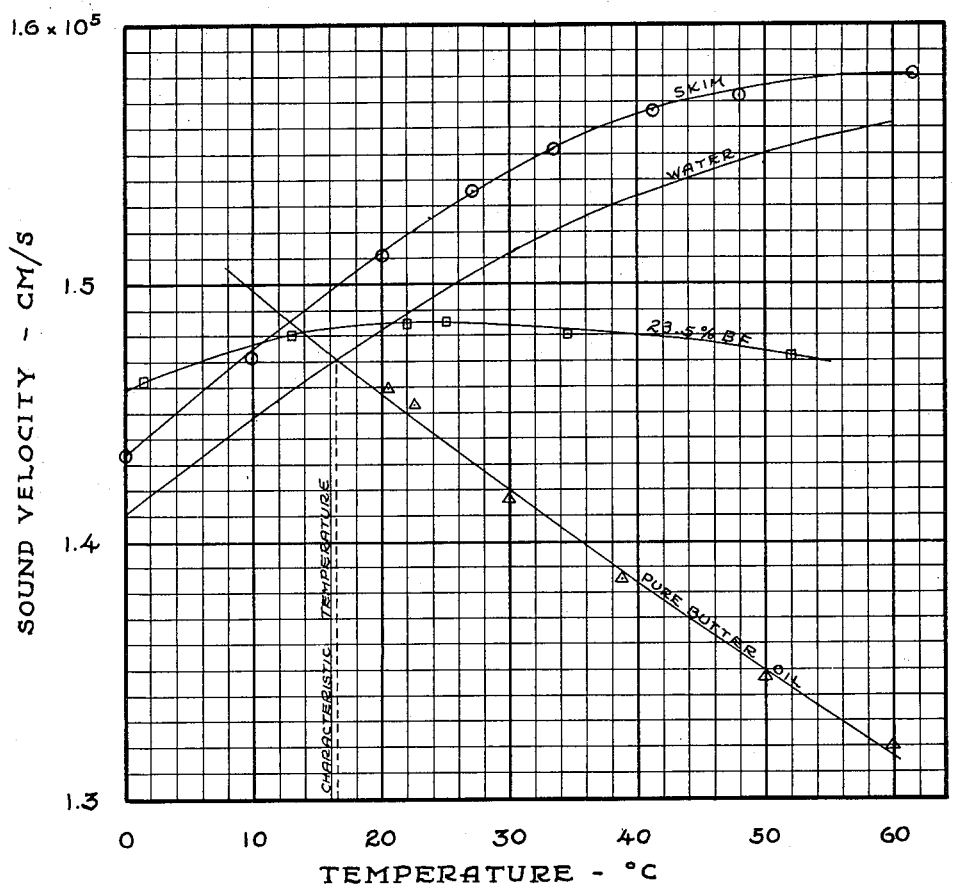
FIG. 5 is a chart showing the determination of "characteristic" temperatures for milk and milk products in accordance with the invention as well as the variation of velocity with temperature for several milk systems.

A specific embodiment of our methods of using elastic waves in the measurement of the constituents of milk and milk products is shown in FIG. 1. The sample of milk 1 is contained in a cell 2, on one of which a piezoelectric crystal 3 is mounted. The other end of the cell is terminated by a reflector assembly consisting of an acoustic reflector 4, a coil spring 5, and micrometer screw 6. The screw, acting in opposition to the spring, serves to position the reflector in the milk sample. The crystal has one grounded electrode 7 and one insulated electrode 8. An electron tube oscillator 9 is coupled through a radio frequency transformer 10 for the purpose of driving the crystal at one of its modes of vibration. A radio frequency milliameter 11 indicates the radio frequency current in the crystal. As a consequence of the piezoelectric properties of the crystal, elastic waves are set up in the milk which propagate through the milk to the reflector where they are reflected back. The reflected waves react on the vibrating crystal in accordance with their relative phase and amplitude, the net result being that the crystal current goes through cyclic variations as the reflector is moved away from the vibrating source. The spacing of the peaks of current determines the wave length in the milk system. The product of this wave length and the known frequency of the oscillator is the velocity of sound in the milk. Moreover, the amount of the reaction, as evinced by the magnitude of the peaks, is related to the attenuation in the milk. Consequently, the apparatus shown in FIG. 1 can be used to determine the solids-not-fat and the butter fat content of the milk sample by some of the basic methods previously discussed.

Another apparatus suitable for operation by our basic methods listed above is shown in FIG. 2. The output from an oscillator 21 of suitable frequency is passed through a pulse forming network 22 to form a pulse of constant amplitude and width; thence through an electronic gate 23, gate 28 being closed, to a piezoelectric crystal 24 mounted in the side of a milk flow orifice 25. The electrical pulse energizes the crystal and sends an acoustical pulse through the milk 26 to the reflector 27 where it is reflected back to the crystal. The crystal now acts as a receiver and generates an electrical pulse which passes through gate 28, gate 23 now being closed, to the trigger network 29 which, in turn, again triggers the pulse network. The pulse rate for a fixed acoustic path length will depend directly on the time taken for the acoustic pulse to travel to the reflector and back, and, therefore, on the velocity of propagation in the milk. The signal from the pulse network is also fed to a suitable amplifier 210 and thence to an averaging output meter 211. The meter can be calibrated directly in solids-not-fat or in butter fat, depending on which of the basic methods is being used. Thus, this apparatus enables one to make direct and instantaneous and continuous determinations of the constituents of milk and milk products.

Another apparatus suitable for operation by our ultrasonic methods is shown in FIG. 3. Here an oscillator 31 drives a transmitting crystal 32 directly at a high enough frequency so that standing wave effects are negligible. The output from a small receiving crystal 33 is amplified 34 and fed to a recorder 35. The amplitude of the recording will depend on the attenuation in the milk and can be calibrated directly in, for example, percent butter fat. By synchronizing the time axis of the recorder with the output from a flow meter 36 measuring the rate of flow of milk through the orifice, the area under the recording curve can be made to measure the total butter fat content of the milk that has passed through the orifice. Another variation of this same apparatus would use an integrating circuit on the output. This would give a continuous running total of the butter fat.

FIG. 4 depicts a transducer head suitable for use with either of the circuits of FIGURE 2 or FIGURE 3. A cylindrical housing 41 has a pair of matched crystals, 42 and 43, mounted opposite to one another. The leads are brought through a cover 44 by means of a cable 45 which leads to the measuring circuit. Such a transducer can be mounted in a milk weighing tank by means of the flange or simply immersed by means of a long rod. For the pulse system, only one crystal is used, the other acting as a reflector.

In the above described apparatuses the output signal can also be used to control a given phase of a manufacturing process. For example, the rate at which milk is drawn from the vacuum pan in a condensed milk operation could be controlled by the amount of solids-not-fat. Or, our acoustic methods can be used to control the introduction of moisture in the cheese cooker so as to control the total solids content of processed cheese.

Clearly any of these apparatuses can be modified to suit a particular installation of dairy equipment.

The experimental variation in sound velocity as a function of temperature for various milk systems is shown in FIG. 5. The velocity in water increases over the temperature range shown. From the skimmed milk curve it is clear that the addition of solids-not-fat merely translates this curve upwards. The velocity in pure butter oil, however, decreases as the temperature is increased. The water and butter oil curves intersect at approximately 16.5° C., which intersection we have defined as the "characteristic" temperature. Intermediate between the skimmed milk curve and the pure butter oil curve is a curve for cream containing 23.5% butter fat. The effect of the addition of butter fat to the skimmed milk is to progressively swing the curve downward towards the pure butter oil. FIG. 5 clearly illustrates the significance of the characteristic temperature in our acoustic methods.

From the foregoing description of our invention, it will be clear to those skilled in the art that the use of elastic waves to determine the constituents of milk and milk products constitutes a novel solution to an important problem. The physical, chemical and electrical methods that have been and are now in use are based on different principles and use different equipment. Moreover, our methods are not to be confused with high energy sonic and ultrasonic methods for producing soft-cured milk, etc. Physical and chemical modifications of the milk system are specifically avoided in our methods, particularly through the use of low energy.

It will be understood that the present invention is not confined to the precise methods and procedures nor the precise construction and arrangement of parts as herein illustrated and described, but employs all modifications thereof within the scope of the following claims.

We claim:

1. The method of determining the solids-not-fat content of a milk or milk product containing fat which comprises, subjecting a portion of said milk or milk product to the approximate temperature at which sound travels at substantially the same speed in said fat and in water, both substantially pure, propagating a sound wave through said portion while avoiding any substantial chemical or physical modification of the milk system and measuring a propagation constant of said sound wave as an index of said solids-not-fat content.

2. The method of claim 1 wherein the propagation velocity of the sound wave is measured.

3. The method of determining the solids-not-fat and the fat content of a milk or milk product which comprises, subjecting a portion of said milk or milk products to the approximate temperature at which sound travels at substantially the same speed in said fat and in water, both substantially pure, propagating a sound wave through said portion while avoiding any substantial chemical or physical modification of the milk system and measuring a propagation constant of said sound wave as an index of said solids-not-fat content and another propagation constant of said sound wave as an index of said fat content.

4. The method of claim 3 wherein the solids-not-fat index measurement is a measurement of the progagation velocity of the sound wave.

5. The method of claim 4 wherein the fat index measurement is a measurement of the attenuation of the sound wave.

6. The method of claim 4 wherein the fat index measurement is a measurement of the scattering of the sound wave.

7. The method of determining the fat content of a milk or milk product which comprises, propagating a sound wave through a portion of said milk or milk product while avoiding any substantial chemical or physical modification of the milk system, varying the temperature of said portion whereby to change the velocity of said sound wave and measuring said change of velocity with reference to said variation in temperature as an index of said fat content.

8. The method of determining the fat content of a milk or milk product which comprises, propagating a sound wave through at least a portion of said milk or milk product while avoiding any substantial chemical or physical modification of the milk system, varying the temperature of at least a portion whereby to change the velocity of said sound wave and measuring said change of velocity with reference to said variation in temperature as an index of said fat content.

References Cited in the file of this patent

UNITED STATES PATENTS

| | | |
|---|---|---|
| 2,174,169 | Risberg | Sept. 26, 1939 |
| 2,473,765 | Platts | June 21, 1949 |
| 2,490,452 | Mason | Dec. 6, 1949 |
| 2,518,348 | Mason | Aug. 8, 1950 |
| 2,536,025 | Blackburn | Jan. 2, 1951 |
| 2,573,390 | Blanchard | Oct. 30, 1951 |

OTHER REFERENCES

Ultrasonics: Bergman, Hatfield (1938), John Wiley and Sons (pages 106, 107, 109, 121, 127, 128). (Copy in Patent Office Library.)